S. KALMA.
TROLLEY.
APPLICATION FILED FEB. 28, 1919.
1,312,076.
Patented Aug. 5, 1919.
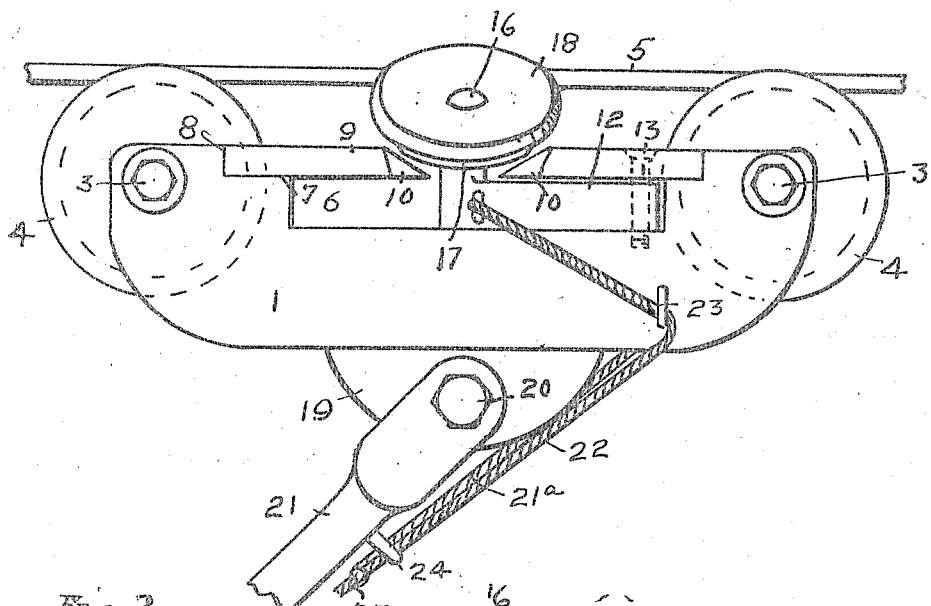
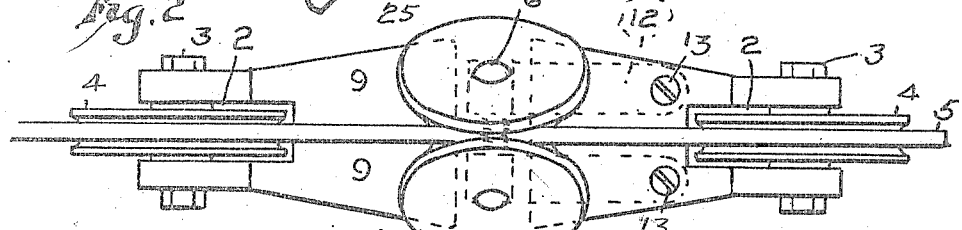
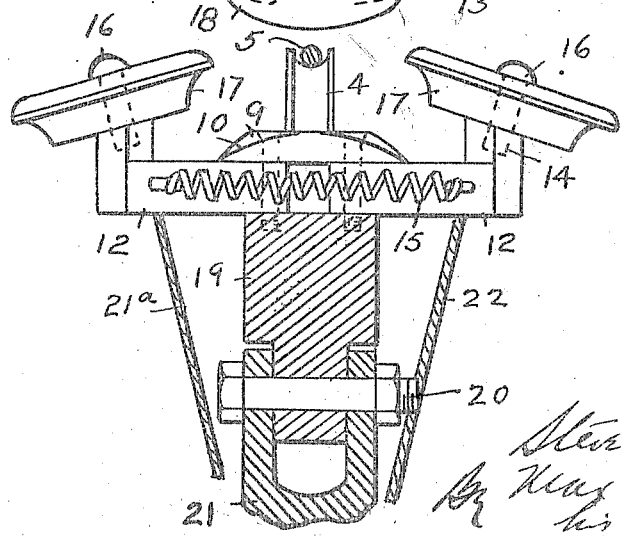
WITNESS
R.F. Dilworth
INVENTOR.

UNITED STATES PATENT OFFICE.

STEVE KALMA, OF BRADDOCK, PENNSYLVANIA.

TROLLEY.

1,312,076.   Specification of Letters Patent.   Patented Aug. 5, 1919.

Application filed February 28, 1919. Serial No. 279,778.

*To all whom it may concern:*

Be it known that I, STEVE KALMA, a citizen of the United States, residing at Braddock, in the county of Allegheny and State of Pennsylvania, have invented certain new and useful Improvements in Trolleys, of which the following is a specification.

This invention relates to trolleys and has for its object to provide a trolley with means, as hereinafter set forth, for maintaining the trolley wheels in contact with the trolley wire when running in grooves or passing over obstructions.

A further object of the invention is to provide a trolley for the purpose set forth having means, in a manner as hereinafter set forth whereby the trolley can be conveniently removed from and replaced against the trolley wire when occasion so requires.

A further object of the invention is to provide a trolley which is simple in its construction and arrangement, strong, durable, efficient and convenient in its use, readily set up and comparatively inexpensive to manufacture.

With the foregoing and other objects in view this invention consists of the novel construction combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:

Figure 1 is a side elevation of a trolley in accordance with this invention.

Fig. 2 is a top plan view.

Fig. 3 is a sectional elevation with the retaining elements extended.

Referring to the drawings in detail 1 denotes the body portion of the trolley, which is bifurcated at each end as at 2, and arranged in the furcated ends on shafts 3, are trolley wheels 4, which travel against the trolley wire 5.

The upper part of the body portion 1 is cut away to form a large groove 6, seat 7, and shoulders 8. Mounted upon each of the seats 7, and abutting against the shoulder 8, is an arm 9, having a beveled inner end 10. The arms 9, extend toward each other, but do not abut, forming a passage therebetween and extend over the groove 6.

Arranged within the passage 6, are a pair of angle-shaped supporting members 12, having their longitudinal legs pivotally connected as at 13, with the body portion 1, and their vertical legs extending upwardly between and above the inner ends of the arms 9, and formed with sockets 14.

Springs 15, are connected to the arms 14 for the purpose of maintaining them within the groove 6. Secured within the sockets 14, are inclined headed shafts 16, on which are mounted retaining members 17, in the form of flanged wheels. The upper ends of the vertical legs of the supporting members 12, are beveled as at 18, to form inclined members for retaining members 17.

Springs 15, maintain the retaining members 17, in position whereby the flanges thereof will overlap the trolley wire 5, under such conditions retaining the trolley wheel 4, in contact with the trolley wire 5.

The body portion 1, has a depending leg 19, to which is pivotally connected as at 20, a trolley pole 21.

Attached to each of the supporting members 12, is a flexible pulling member 21ª, 22, which travels through an eye 23, on the body portion 1, also through an eye 24, on the trolley pole 21. The members 22, are connected together as at 25, and are not only employed for pulling the supporting members 12, open to release the trolley wire 5, from the retaining member 17, but also for the purpose of lowering the trolley when desired.

What I claim is:

A trolley comprising a body portion provided with a groove at its top and having each of its ends bifurcated, spaced arms overlapping said groove, a trolley wheel mounted in each of said bifurcated ends, spring controlled angle shaped supporting members pivotally connected to said body portion arranged in said groove and extending up between said arms, inclined and flanged retaining members revolubly mounted on said supporting members and adapted to overlap the trolley wire to maintain said wheels in contact with the wire and pulling members connected to said supporting members.

In testimony whereof I affix my signature.

STEVE KALMA